United States Patent [19]

Rapp et al.

[11] Patent Number: 4,479,841
[45] Date of Patent: Oct. 30, 1984

[54] INSERTION AND REMOVAL APPARATUS FOR PRESS CAULS

[75] Inventors: Peter Rapp, Eppingen-Muehlbach; Heinrich Ritterhoff, Besigheim, both of Fed. Rep. of Germany

[73] Assignee: Maschinenfabrik J. Dieffenbacher GmbH & Co., Eppingen, Fed. Rep. of Germany

[21] Appl. No.: 420,333

[22] Filed: Sep. 20, 1982

[30] Foreign Application Priority Data

Oct. 5, 1981 [DE] Fed. Rep. of Germany ....... 3139581

[51] Int. Cl.³ .............. B32B 31/00; B23K 27/00; A01N 65/00; B30B 15/30
[52] U.S. Cl. ................................ 156/379.8; 156/580; 100/215; 100/218; 100/295; 101/385; 101/DIG. 12; 425/193
[58] Field of Search ............ 156/580, 581, 582, 583.1, 156/583.5, 379.8, 362, 364; 425/186, 193; 100/215, 218, 295, 216, 196; 414/752; 198/689; 101/382 R, 382 MV, 383, 385, DIG. 12

[56] References Cited
U.S. PATENT DOCUMENTS 3,977,535 8/1976 Hüsges et al. ............... 156/583.1
4,253,891 3/1981 Brussel ............ 156/583.1

Primary Examiner—Edward Kimlin
Assistant Examiner—Merrell C. Cashion
Attorney, Agent, or Firm—Schwartz, Jeffery, Schwaab, Mack, Blumenthal & Koch

[57] ABSTRACT

Apparatus for changing press cauls of a heated press used for fabricating a finished board. A plurality of rods having mandrels are arranged adjacent the longitudinal sides of said cauls and removably positioned in a corresponding plurality of receiving loops secured to each caul. The cauls may then be moved vertically with respect to their platens. Clamps are used to secure each caul to their respective platens. Conveyor belts are used to insert a new caul pack into the press after removal of the old cauls. The conveyor belts are secured to a plurality of arms having suction pickup means and holders used to remove a protective intermediate layer between the cauls for completing the insertion operation.

5 Claims, 9 Drawing Figures

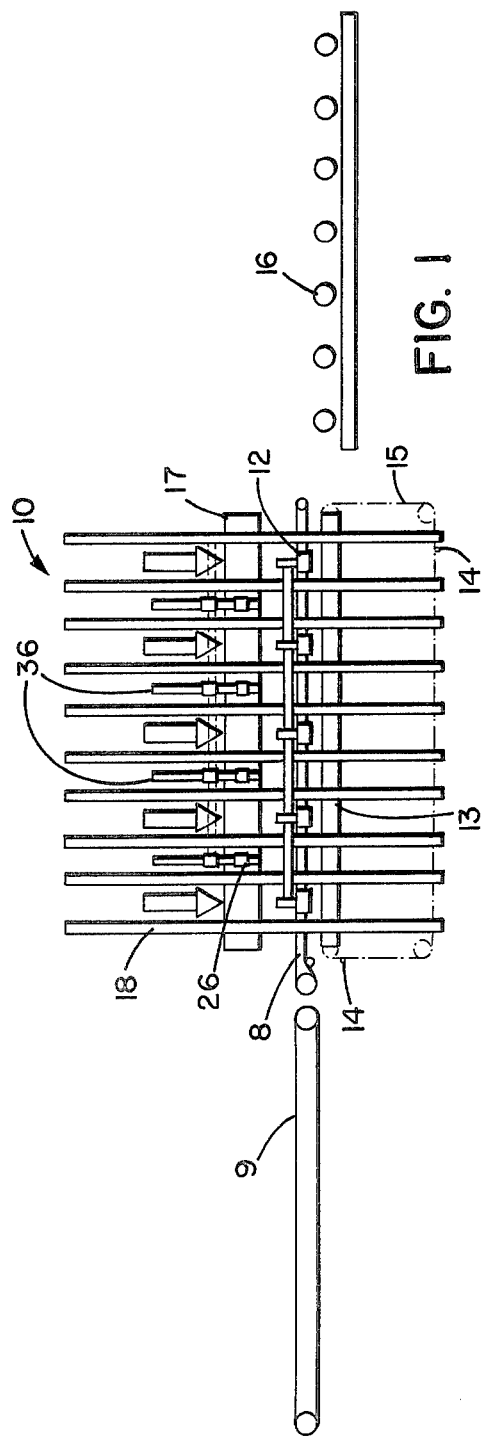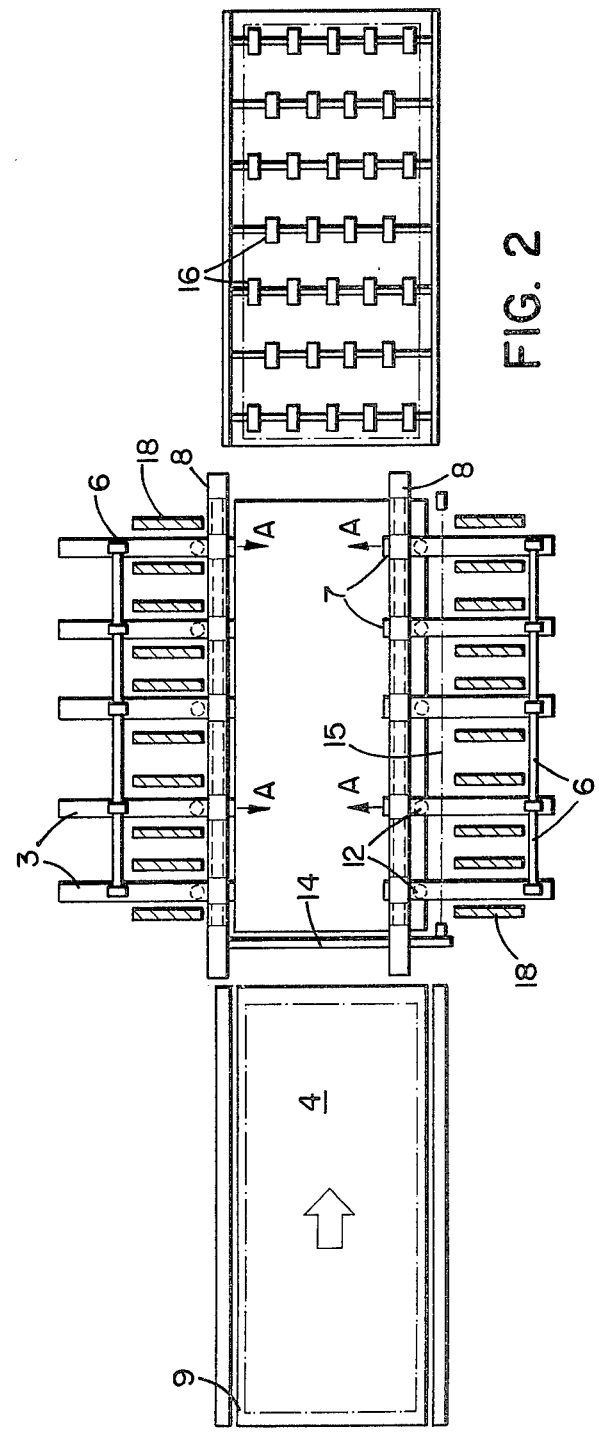

5,479,841

INSERTION AND REMOVAL APPARATUS FOR PRESS CAULS

BACKGROUND OF THE INVENTION

The invention concerns an apparatus for the insertion and removal of cauls into and from a heated press utilized for forming a laminated finished board.

In certain short cycle laminating installations the cauls, variously structures exhibiting definite degrees of gloss, are moved in and out with the material being pressed, and the change of cauls is effected outside the press. In some cases, however, the cauls are in contact over their entire area with the press platens and are further maintained under tensile stress by a caul clamping device. If these press cauls are changed frequently, in case of a small series or for experimental or sample series, much time is lost in changing the cauls and the process is thus costly for the manufacturing company.

SUMMARY OF THE INVENTION

It is therefore the object of the invention to provide an apparatus whereby the change of press cauls may be effected more rapidly.

With the apparatus according to the invention the change of cauls may be executed very rapidly, as all of the work cycles are automated and the installation assures continuous operation.

The invention may be seen to comprise apparatus for changing upper and lower press cauls in a press having upper and lower press platens. The press may be of the heated type, of short cycle for laminating particle board, fiber boards or the like, with synthetic resin impregnated decorative layers, such as melamine or phenolic resin films. The apparatus comprises at least two rods, one rod arranged adjacent each side of the press, a pickup mandrel attached to each rod, a caul changing device, a caul clamping means and a transport means. The press cauls have at least one, and preferably a plurality of receiving loop on each longitudinal side of the press for receiving the pickup mandrels. The caul changing device is operable for controlling the rods and corresponding mandrels for positioning the mandrel within the receiving loops and removing the mandrels from the receiving loops. The caul clamping means releasably clamps each of the cauls to their corresponding press platens. The transporting means transports the cauls, which have been released from their corresponding press platens and mandrels, out of the press and is also operable for transporting a replacement pair of cauls into the press. The mandrels are again operable for positioning the cauls against their respective upper and lower press platens so they may be clamped by the caul clamping means. The transporting means also carries an intermediate protective layer out of the press.

BRIEF DESCRIPTION OF THE DRAWINGS

FIGS. 1 to 9 show an embodiment of the apparatus for the insertion and removal of laminated pressed material. In the figures:

FIG. 1 shows a schematic representation of the inserting and removing apparatus in a lateral elevation, FIG. 2 shows the apparatus according to FIG. 1 in a top view, FIG. 3 shows a partial view of the apparatus according to FIG. 1 during preparation to receive the finished board, FIG. 4 shows the apparatus according to FIG. 3 with the suction lifters in contact with the finished board, FIG. 5 shows the apparatus according to FIG. 3 during the insertion of the laminate pack and discharge (sliding out) of the finished board, FIG. 6 shows the apparatus according to FIG. 3 with the laminate pack in position within the press and with the feeding means in its initial position, FIG. 7 shows the feeder and discharge device in detail, FIG. 8 shows the press caul changing apparatus according to the invention and, FIG. 9 shows a section of a caul in a top view.

DETAIL DESCRIPTION OF THE PREFERRED EMBODIMENT

Figure 3:
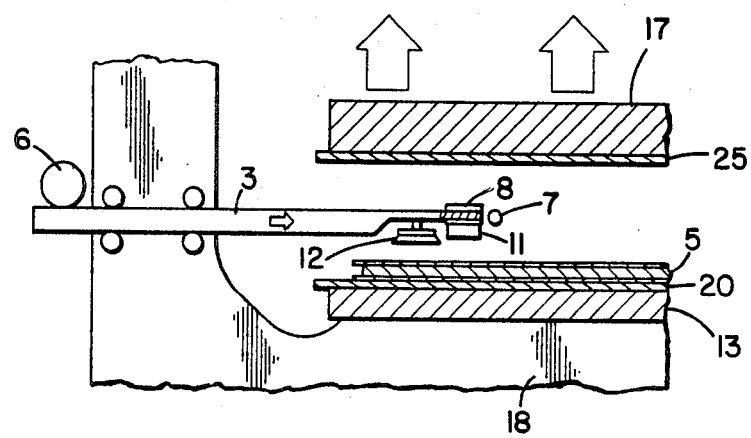

As an aid in the understanding of the caul changing process, a brief description of the feeder and discharge device in the handling of material being pressed is presented. For a more detailed description, reference is made to copending application Ser. No. 420,334, filed Sept. 20, 1982 and entitled "Feed and Discharge Apparatus for a Laminate Press" of Dieter Salenz, incorporated herein by reference. The apparatus shown in FIGS. 1 to 8 serves to insert, press and discharge the laminated material to be pressed, consisting of a top and bottom laminating material 1 and 2, such a hardenable synthetic plastic film, synthetic resin impregnated papers, etc. and the laminate support 19 consisting of a particle board or fiber board.

The overall view of the installation according to FIGS. 1 and 2 shows, from left to right, the insertion and discharge of a laminate pack 4 and a finished board 5 into and from a press 10. Following the opening of the press 10, initially the feeder and discharge devices are moved into the press area by means of a feeder and discharge arms 3, with the aid of a rack and pinion drive 6. The arms 3 are moved transversely to the longitudinal direction of the press 10, from both longitudinal sides, FIG. 3. The feeder and discharge device consists of an assmebly, i.e. suction lifters 12, conveyor belts 8 and suction boxes 11.

Figure 4:
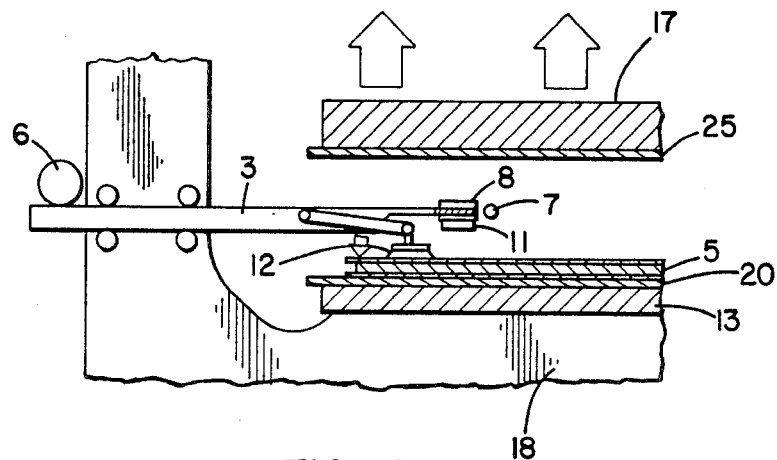
Figure 5:
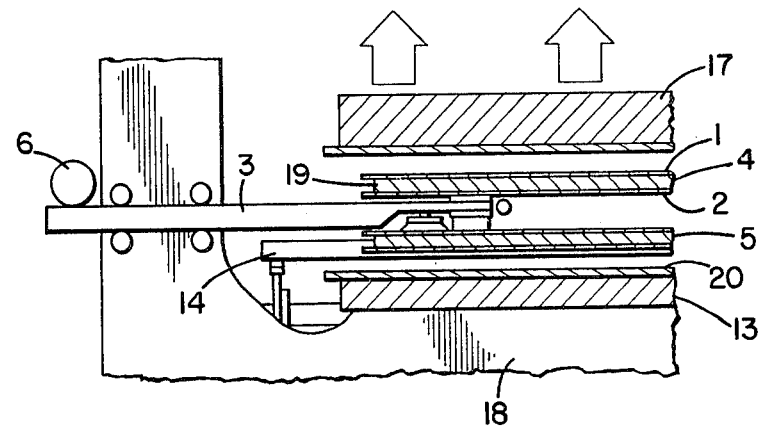
Figure 6:
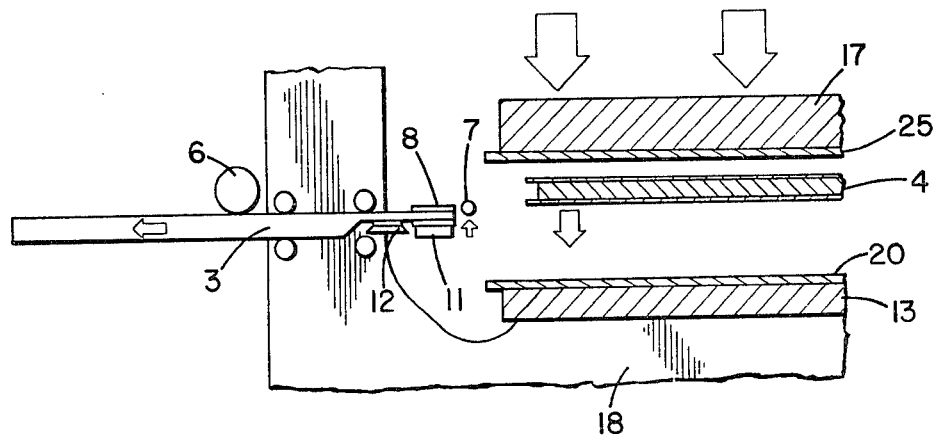
Figure 7:
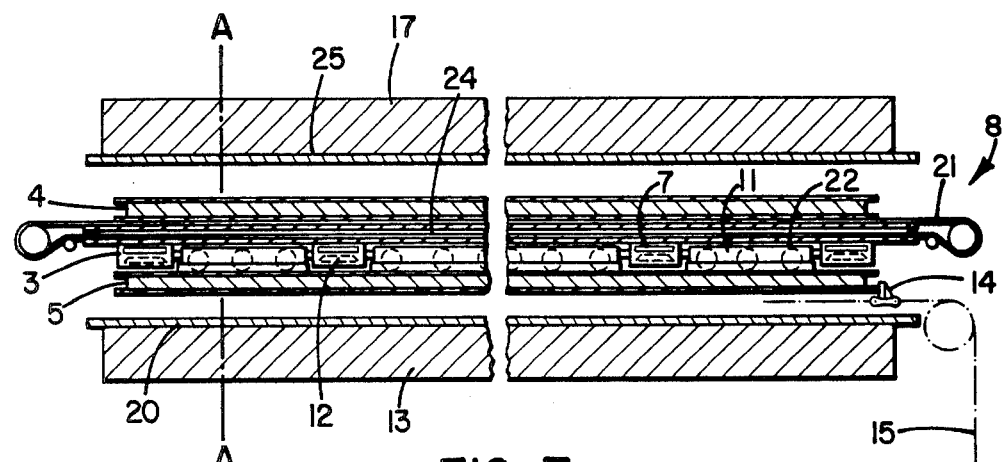
Figure 8:
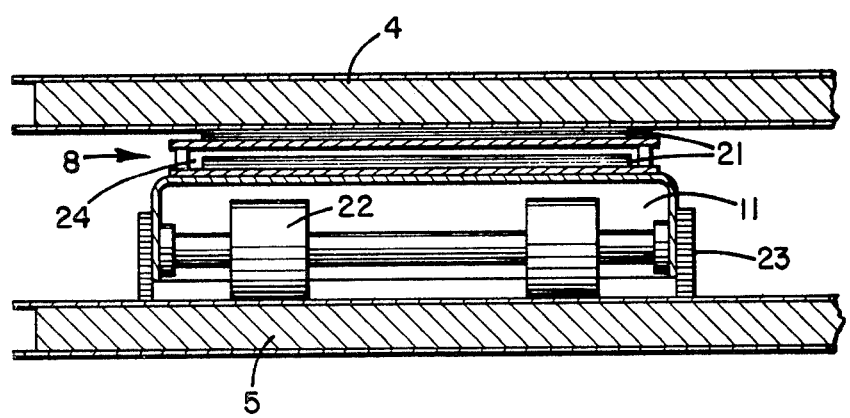

By means of mechanical lever mechanism the suction lifters 12 are lowered onto the laminated finished board 5 (FIG. 4). These lifters grip the board 5, separate it from its support (lower caul 20, press platen 13) and transfer it, with an upward pivoting motion, to the suction boxes 11, (FIG. 5). The suction boxes 11, applying a suction effect to the longitudinal edges of the finished board 5 by means of a high vacuum apparatus (not shown) and support the board 5 with the distance between a sealing lip 23 and the board 5 regulated by spacer rolls 22 positioned within the suction boxes 11. Simultaneously with this processes, conveyors belts 8 seize the laminate pack 4 moved by the feed conveyor 9 and transport it into the press 10. In order to prevent sliding during the acceleration and braking of the laminate pack 4, the high temperature resistant feeder belts of the conveyors 8 are made of perforated bands 21, and the support of the conveyor is made of a vacuum suction plate 24. During the assembly of the laminate pack 4, the latter may be additionally ionized. As soon as the transfer of the finished board 5 to the suction boxes 11 is completed, the finished board 5 is moved from the press area onto the conveyor belt 16, by means of a discharge ledge 14, moved with the aid of a chain drive 15 on both sides of the press platen 13, around the press table and the press frame 18. During its removal from the press 10, the finished board 5 moves below and across the suction boxes 11, aided by the spacer rollers, and the latter are successively deactivated by a plurality of valves following the passage of the discharge ledge 14.

Figure 9:
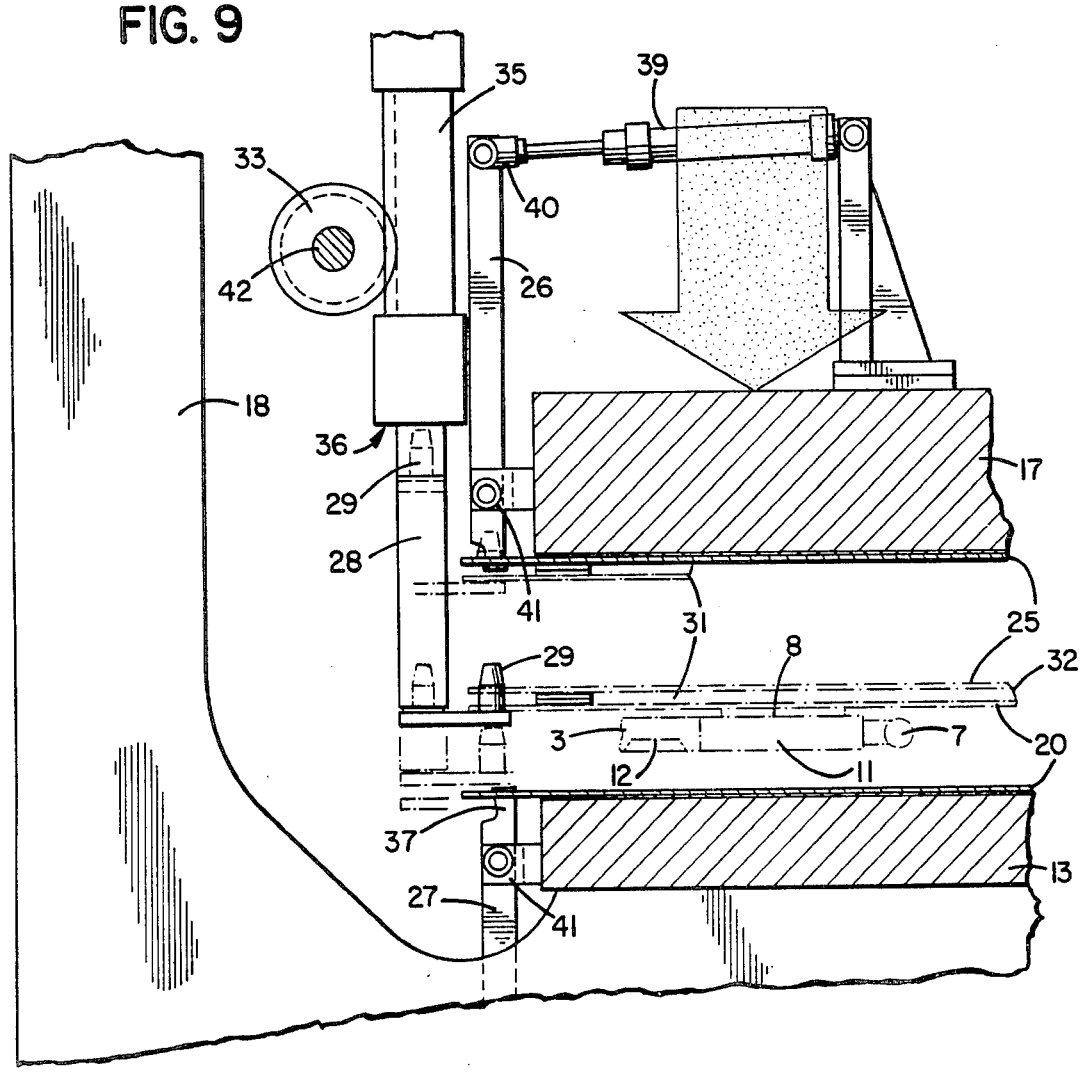
Figure 10:
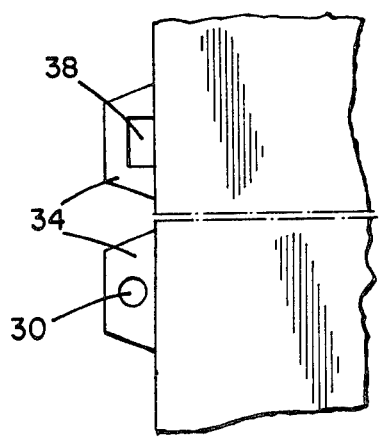

The apparatus for the changing of press cauls 20 according to the invention operates as follows (FIGS. 9 and 10):

Following the opening of the press 10, initially the protective intermediate layer 31, is transported by the roll conveyor belt 8, inserted into the press 10 and placed onto the lower press caul 20. Following the running of the conveyor belts 8, the press tup descends with the upper press platen 17 and the caul clamping devices 26 and 27, and the upper and lower cauls 25 and 20, are released. The caul clamping devices 26 and 27 have hook-like grips 37 articulated at 41 for engaging recesses 38 of the cauls 20 and 21. A hydraulic compression and tensile device 39 control the caul clamping device 26 via articulation 40. The caul changing device 36 pivots the pickup mandrels 29, connected via rods 28, under the press cauls 20 and 25 and moves them into the loops 30. The rods 28 pass into racks 35. The racks 35 are raised and lowered by means of gear wheels 33 and a single drive shaft 42 for each side of the press. The press tup and the caul changing device 36 move up, and the conveyor belts 8 move under the caul pack 32 into the press. The caul pack 32 comprises protective intermediate layer 31 and caul 20 and 25.

The caul changing device 36 places the caul pack 32 onto the conveyor belts 8 and moves the pickup mandrels 29 out from the loops 30. The caul pack 32 is now transported from the conveyor belts 8 to the discharge conveyor 16, for removal into caul storage.

To insert a new caul pack 32, it is placed initially onto the conveyor belt 16, and aligned and inserted into the press 10 by means of the conveyor belts 8.

By means of the conical pickup mandrels 29 of the caul changing device 36, the caul pack 32 is again aligned an removed from the conveyor belts 8.

While the conveyor belts 8 are moving out of the press 10, the caul changing device 36 moves up with the caul pack 32 and abuts against the upper press platen 17. Subsequently, the upper caul clamping device 26 receives the upper press caul 25 and clamps it against the press platen 17. The caul changing device 36 moves away with the protective intermediate layer 31 and the lower press caul 20. The lower caul clamping device 27 seizes the lower caul 20 and clamps it to the press platen 13.

To remove the protective intermediate layer 31 the feeder and discharge device 8, 11 and 12 is moved into the press area. The suction lifters 12 raise the protective intermediate layer 31 against the suction boxes 11 and the intermediate layer 31 is thereby transported to the discharge conveyor 16, possibly with the aid of the discharge ledge 14.

Although the invention has been described in terms of a preferred embodiment, modification and improvements may be made by those skilled in the art without departing from the scope of the invention.

We claim:

1. Apparatus for changing upper and lower press cauls in a press having upper and lower press platens, comprising:
   (a) at least two rods, one rod arranged adjacent each side of said press,
   (b) a pickup mandrel attached to each of said rods,
   (c) said press cauls having at least one receiving loop on each side thereof for receiving said mandrel,
   (d) control means to position said mandrels within said receiving loops and remove said mandrels from said receiving loops,
   (e) caul clamping means releasably clamping each of said cauls to their corresponding press platens, and
   (f) means for transporting said cauls, released from their corresponding press platens and released from said mandrels, out of said press and for transporting another pair of cauls into said press.

2. Apparatus as recited in claim 1 wherein said other pair of cauls has an intermediate layer therebetween and said transporting means is operable for transporting said intermediate layer out of said press after said other pair of cauls is secured to their respective upper and lower press platens.

3. Apparatus as recited in claim 1 wherein said transporting means is operable for inserting into said press, a laminate pack to be pressed to form a finished board in said press after changing of said cauls.

4. Apparatus as recited in claim 1 wherein said caul changing device includes racks connected to said rods and raised and lowered by means of gear wheels engaging said racks.

5. Apparatus as recited in claim 4 wherein along one side of said press, a single drive shaft drives each of said gear wheels.

* * * * *